United States Patent [19]

Reddy

[11] Patent Number: 4,929,385
[45] Date of Patent: May 29, 1990

[54] FREON FREE PROCESS FOR PREPARING A NIOBIUM ACTIVATED YTTRIUM TANTALATE X-RAY PHOSPHOR

[75] Inventor: Vaddi B. Reddy, Sayre, Pa.

[73] Assignee: GTE Products Corporation, Stamford, Conn.

[21] Appl. No.: 362,720

[22] Filed: Jun. 7, 1989

[51] Int. Cl.$^5$ ............................................. C09K 11/78
[52] U.S. Cl. ............................................. 252/301.4 R
[58] Field of Search ................................. 252/301.4 R

[56] References Cited

U.S. PATENT DOCUMENTS

| 3,459,674 | 8/1969 | Emoto et al. | 252/301.4 R |
|---|---|---|---|
| 4,024,069 | 5/1977 | Larach | 252/301.4 R |
| 4,225,653 | 9/1980 | Brixner | 252/301.4 R |

FOREIGN PATENT DOCUMENTS

| 202875 | 11/1986 | European Pat. Off. | 252/301.4 R |
|---|---|---|---|
| 49-4311 | 9/1974 | Japan | 252/301.4 R |

OTHER PUBLICATIONS

Brixner et al. "J. Electrochem. Soc.", vol. 30, No. 12, 1983, pp. 2435–2443.

*Primary Examiner*—Jack Cooper
*Attorney, Agent, or Firm*—L. Rita Quatrini; Robert E. Walter

[57] ABSTRACT

A process is disclosed for preparing M' YTaO$_4$:Nb X-ray phosphor which comprises forming a uniform first mixture of Y$_2$O$_3$, Ta$_2$O$_5$, and Nb$_2$O$_5$ in amounts equal to approximately the stoichiometric amounts to form the phosphor, milling with deionized water as the milling fluid, removing the water, forming a uniform second mixture of the first mixture and a flux which can be lithium sulfate, lithium chloride or a mix of lithium sulfate and potassium sulfate in a mole ratio of 80 to 20, the flux making up about 25% to 50% by weight of the second mixture, firing the second mixture in a furnace by heating to a temperature of about 1200° C. to 1300° C. at a heating rate of about 1.0° C./minute to 1.5° C./min. and maintaining the temperature for about 10 to 14 hours to react the components and produce a fired material containing luminescent material, cooling the material by turning off the heat and allowing the material to remain in the furnace until the temperature is no higher than about 300° C., washing with deionized water, removing the wash water, drying, and classifying to obtain a $-325$ mesh particle size. The phosphor exhibits a brightness at least comparable to phosphors produced by methods absent water as the milling fluid.

2 Claims, No Drawings

FREON FREE PROCESS FOR PREPARING A NIOBIUM ACTIVATED YTTRIUM TANTALATE X-RAY PHOSPHOR

CROSS REFERENCE TO RELATED APPLICATIONS

This application is related to application Ser. No. 362,721 entitled "Process For Preparing A Niobium Activated Yttrium Tantalate X-ray Phosphor" and application Ser. No. 362,717 entitled "Process For Improving The Luminescence of Niobium Activated Yttrium Tantalate X-Ray Phosphor", both assigned to the same assignee as the present application and filed concurrently herewith.

BACKGROUND OF THE INVENTION

This invention relates to a process for preparing M' niobium activated yttrium tantalate X-ray phosphor having an M' crystal structure by a method in which deionized water is used as the milling fluid replacing freon and/or acetone which are environmentally hazardous. Also the heating and cooling schedules are critical. The phosphor is essentially M'YTaO$_4$ and exhibits comparable luminescent properties to phosphors produced using freon as the milling fluid.

X-ray phosphors are used in x-ray intensifying screens which are used along with photographic film to enhance the photographic image formed on the film at the same time reducing the x-ray dose on the object during medical radiographic procedures. Phosphor materials used in these intensifying screens are to be colorless single phase with a polyhedral shape of well-defined crystal morphology. Also, the phosphors have to be good x-radiation absorbers and emit the light (energy) in the spectral region to which the photographic film is sensitive. Generally, it is required that the phosphor particle size be about 4–11 micrometers in order to form a thin layer when drawn in the form of screens using certain binder solutions as media. The phosphor material also has to have a high x-ray energy absorbing property. After absorbing the x-ray energy, when exposed, the phosphor should emit photons (light) strongly in the spectral region of the film sensitivity. The efficiency of x-ray energy-to-light conversion should be intense enough to obtain undistorted and sharp film images. There are several materials of such kind but only few have good properties necessary to make them as useful materials for intensifying screen applications.

Blasse and Bril (J. Luminescence, 3,109 (1970)) describes the cathodo-and-photo luminescence properties of various rare earth tantalate phosphors. These material have fergusonite (M-type) monoclinic crystal structure. Wolten & Chase (American Minerologist, 52, 1536 (1967)) report that this type of tantalates (e.g. YTaO$_4$, and other rare-earth tantalates) have two polymorphs, a monoclinic (I$_2$ Space group) structure-M at low temperature and a tetragonal (Scheelite type structure with I$_{41/a}$ space group) at high temperature. Crystal structure transition between these two forms occurs at 1325° C. in YTaO$_4$ and is reversible. They disclose also the formation of a new polymorph of yttrium tantalate and other rare earth tantalates. This new polymorph is obtained when the tantalates are synthesized (crystallized) below the above mentioned (1325° C.) transformation and this polymorph has a monoclinic structure with P$_{2/a}$ space group which is called M' phase. M' phase can be converted to M phase by heating above 1400° C. and then cooling to below the transition (1325° C.) temperature.

Brixner & Chen (J. Electrochemical Soc., 130 (12), 1983, 2435–43) and U.S. Pat. No. 4,225,653 describe the preparation and the crystal structure of M' phase rare earth tantalate materials and their luminescence properties. They also demonstrate that the M' phase yTaO$_4$ is an efficient host for x-ray phosphor when activated with niobium and some rare earth ions. However, it has been found that the preparation procedure is critical to obtain a single phased M'—YTaO$_4$ with increased brightness when activated with niobium. Brixner & Chen recommend the preparation of niobium activated M' rare earth tantalate phosphor by pre-firing the component oxides TaO$_5$, NbO$_5$, and Ln$_2$O$_3$ (Ln=La, Y, Ce, and Lu) at 1200° C. for 8–10 hours. The reaction products are then milled using freon solvent as grinding fluid for about 6 hours using alumina beads as grinding medium. The resulting mixture is then either alone or with 50% by weight lithium sulfate as flux material, fired at 1250° C. for 10–14 hours. This procedure is cumbersome and the freon used in milling is expensive and environmentally hazardous.

SUMMARY OF THE INVENTION

It is an object of the present invention to provide a process for producing M' YTaO$_4$:Nb x-ray phosphor having a comparable or better luminescence emission efficiency over this type of phosphor produced by prior methods.

It is another object of the present invention to provide a process for producing M' YTaO$_4$:Nb x-ray phosphor to eliminate the environmentally hazardous freon as milling fluid and still obtain a high quality phosphor for radiography applications.

It is another object of the present invention to provide an economically feasible milling fluid to aid in mixing the reactant materials before firing to insure a uniform mix of the reactant materials.

In accordance with one aspect of the invention, there is provided a process for preparing M' YTaO$_4$:Nb X-ray phosphor which comprises forming a uniform first mixture of Y$_2$O$_3$, Ta$_2$O$_5$, and Nb$_2$O$_5$ in amounts equal to approximately the stoichiometric amounts to form the phosphor, milling with deionized water as the milling fluid, removing the water, forming a uniform second mixture of the first mixture and a flux which can be lithium sulfate, lithium chloride or a mix of lithium sulfate and potassium sulfate in a mole ratio of 80 to 20, the flux making up about 25% to 50% by weight of the second mixture, firing the second mixture in a furnace by heating to a temperature of about 1200° C. to 1300° C. at a heating rate of about 1.0° C./minute to 1.5° C./min. and maintaining the temperature for about 10 to 14 hours to react the components and produce a fired material containing luminescent material, cooling the material by turning off the heat and allowing the material to remain in the furnace until the temperature is no higher than about 300° C., washing with deionized water, removing the wash water, drying, and classifying to obtain a −325 mesh particle size. The phosphor exhibits a brightness at least comparable to phosphors produced by methods absent water as the milling fluid.

DETAILED DESCRIPTION OF THE INVENTION

For a better understanding of the present invention, together with other and further objects, advantages and capabilities thereof, reference is made to the following disclosure and appended claims in connection with the above description of some of the aspects of the invention.

The present invention provides a method for a preparing a M' phase niobium activated yttrium tantalate x-ray phosphor in which the freon milling fluid is eliminated without sacrificing any appreciable brightness in the phosphor. The same quality phosphor is obtained as when freon is used.

The phosphor of the present invention is M' $YTaO_4$:Nb. The M' structure of $YTaO_4$ lattice constants of the present invention are comparable to those reported in U.S. Pat. No. 4,225,653.

A uniform first mixture is formed consisting essentially of the components from which the phosphor is to be made. The components are $Y_2O_3$, $Ta_2O_5$, and $Nb_2O_5$. The components are provided in an amount equal to at least the stiochiometric amount required to form the phosphor. The mixture is formed by any known dry blending technique.

The first mixture is milled in deionized water for typically from about 1 hours to about 4 hours. The milling is done typically in a vibratory mill such as a SWECO mill. The milling step is critical and must insure that the mixture components are uniformly mixed. A preferred non-limiting procedure for milling for example, about 660 grams of reactive components and an equal amount of flux material is to mill for about 1.0 hours with about 500–600 ml of deionized water using about 2 kg of 0.25" high density alumina beads as the milling media. If the mixture is not uniform, the single phase crystal will not be formed and impurities such as $Y_3TaO_7$ and $Li_3TaO_4$ can form. Use of deionized water replaces freon as the milling fluid.

The deionized water is then removed from the milled mixture. This is done by removing most of the water by decantation or filtration, followed by drying to remove the rest of the water.

A second mixture is then formed of the first mixture and a flux. The flux can be lithium sulfate, lithium chloride, or a mix which consists essentially of lithium sulfate and potassium sulfate in a mole ratio of lithium sulfate to potassium sulfate of about 80 to 20. This is a eutectic mixture. The flux makes up from about 25% to about 50% by weight of the second mixture and most preferably about 50% by weight.

The second mixture is then fired according to the following specific heating schedule to produce a fired material containing luminescent material. The reactive component-flux mixture is loaded into a furnace typically an electric or gas-fired furnace, preferably in covered alumina containers. The furnace is then heated slowly from a starting temperature which is normally below about 300° C. up to a temperature range of from about 1200° C. to about 1300° C. at a heating rate of from about 1.0° C. per minute to about 1.5° C. per minute. This usually takes about several hours. This temperature range is maintained for from about 10 hours to about 14 hours.

The resulting fired material is then cooled according to a specific cooling schedule. The heat to the furnace is turned off and the fired material is allowed to remain in the furnace until the furnace has cooled to a temperature of no higher than about 300° C. When a temperature of about 300° C. or lower is reached, the cooled material can be taken out of the furnace.

The above described slow heating and cooling procedure ensures better reactivity of the components of the mixture with the flux being melted.

The resulting cooled material is then washed with deionized water to remove the fluxes. This is usually done by first soaking the cooled material in hot deionized water and then slurrying repeatedly with fresh deionized water and testing for absence of sulfate when lithium sulfate is used as the flux and chloride when lithium chloride is used as the flux. The wash water is then removed from the washed material. Other washes can be put on the material such as isopropanol or reagent alcohol to fast dry the material, but this is not necessary.

The washed material which is M' niobium activated yttrium tantalate phosphor is dried usually at about 120° C. in an oven.

The phosphor is then classified to obtain a $-325$ mesh particle size.

The phosphor is M' $YTaO_4$ which exhibits a brightness or luminescence efficiency comparable to the material obtained from a freon milling process.

To more fully illustrate this invention, the following non-limiting examples are presented.

EXAMPLE 1

About 225.81 grams of $Y_2O_3$, 441.89 grams of $Ta_2O_5$, and 5,3162 grams of $Nb_2O_5$ are blended in a polyethylene-lined stainless steel SWECO jar. The blend is then milled in a SWECO vibratory mill for about 2 hours using 2 kg of 0.25" high density alumina beads as milling media. About 500–600 ml of freon is used as the milling fluid. The jar is taken out of the mill and the milled mixture is allowed to settle. The freon solvent is then separated or evaporated at room temperature in air and the dried powder is then treated with an equal amount of about 50% by weight lithium sulfate as the flux material and this second mixture is then loaded into alumina crucibles and fired at from about 1280°–1300° C. for about 10–12 hours in an electric furnace. The resulting fired cakes are soaked in deionized water and all the sulfate is leached out with subsequent deionized water washings. When the washes are free from any sulfate, the product is filtered and dried at about 120° C. and then sieved through a 325 mesh screen. The phosphor prepared from this method has a formula of $YTa_{0.98}Nb_{.02}O_4$. This sample is then measured on x-ray excited optical fluorescence spectrometer for its light output (brightness). Its brightness is taken as 100 (standard) and particle size is about 6.6 micrometers in diameter with a Q.D. of about 0.29.

EXAMPLE 2

About 45.16 g of $Y_2O_3$, about 86.61 g of $Ta_2O_5$, and about 1.063 g of $Nb_2O_5$ are blended in a polyethylene lined stainless steel SWECO jar. The mixture is the milled in a SWECO vibratory mill for about 2 hours with about 750 g of ¼" size alumina beads in about 200 ml of Freon (trichloro trifluoro ethane). After the milling step, the freon is separated and allowed to evaporate in air and the mixture is dried at about 120° C. The dried material is then treated with an equal amount by weight of flux consisting essentially of 80:20 mole ratio mixture of lithium sulfate : potassium sulfate that forms a eutectic. The resulting mixture is then loaded into an alumina crucible and fired as described in Example 1. The post-firing procedure is similar to that described in Example 1. The stoichiometry of the phosphor thus obtained is $YTa_{0.98}Nb_{0.02}O_4$ and the particle size (50%) as measured by Coulter Counter is about 7.0 micrometers in diameter and the QD is about 0.23.

EXAMPLE 3

About 45.16 g of $Y_2O_3$, about 86.61 g of $Ta_2O_5$ and about 1.063 g of $Nb_2O_5$ are weighed and mixed together in a polyethylene lined SWECO jar. This mixture is milled in a SWECO vibratory mill for about 2 hours with about 750 g of ¼" size alumina beads in about 200 ml of deionized water. The jar is taken out of the mill and the mixture is allowed to settle. The deionized water is then decanted off and the powder is filtered and dried. The dried powder is then treated with an equal weight amount of a flux consisting essentially of a mixture of lithium sulfate and potassium sulfate in a mole ratio of about 80 to 20 lithium sulfate to potassium sulfate to form a eutectic. The firing and post-firing procedures are the same as described in Example 1. The brightness is about 101% and the 50% Coulter Counter particle size is about 8.0 micrometers.

Table 1 shows brightness and particle size data for phosphors prepared by milling in freon, (the prior method) and deionized water (this invention).

TABLE 1

| # | Flux | Milling fluid | XOF Brightness |
|---|------|---------------|----------------|
| 1 | $Li_2SO_4$ | Freon | 100 |
| 2 | $Li_2SO_4/K_2SO_4$ | Freon | 103 |
| 3 | $Li_2SO_4/K_2SO_4$ | Water | 101 |

The Table shows that brightness and particle size is not adversely affected by the deionized water milling. From these examples it is clear that environmentally hazardous and expensive freon can be eliminated from the process and water can be used as the milling fluid. The brightness properties are similar and the particle size characteristics of phosphors produced using freon and water are essentially the same.

While there has been shown and described what are at present considered the preferred embodiments of the invention, it will be obvious to those skilled in the art that various changes and modifications may be made therein without departing from the scope of the invention as defined by the appended claims.

What is claimed is:

1. A process for preparing M' $YTaO_4$:Nb X-ray phosphor, said process comprising:
   (a) forming a uniform first mixture consisting essentially of $Y_2O_3$, $Ta_2O_5$, and $Nb_2O_5$ components, said components being provided in an amount equal to approximately the stoichiometric amounts required to form said phosphor;
   (b) milling said first mixture with deionized water;
   (c) removing said water from the resulting milled first mixture;
   (d) forming a uniform second mixture consisting essentially of said first mixture and a flux, said flux selected from the group consisting of lithium sulfate, lithium chloride and a mix of lithium sulfate and potassium sulfate wherein the mole ratio of lithium sulfate to potassium sulfate in said mix is about 80 to 20, said flux making up from about 25% to about 50% by weight of said second mixture;
   (e) firing said second mixture in a furnace by heating said mixture in said furnace from a temperature below about 300° C. to a temperature of from about 1200° C. to about 1300° C. at a heating rate of from about 1.0° C./minute to about 1.5° C. per minute and maintaining said temperature for from about 10 hours to about 14 hours to react said components and produce a fired material containing luminescent material;
   (f) cooling the resulting fired material by turning off the heat to said furnace and allowing said fired material to remain in said furnace until the temperature in said furnace is no higher than about 300° C.;
   (g) washing the resulting cooled material with deionized water to remove essentially all of said flux therefrom and produce a washed M' niobium activated yttrium tantalate phosphor;
   (h) removing the wash water from and drying said washed phosphor; and
   (i) classifying the resulting dried phosphor to obtain a −325 mesh particle size in said phosphor,.

2. A process of claim 1 wherein said flux is a mix of lithium sulfate and potassium sulfate wherein the mole ratio of lithium sulfate to potassium sulfate in said mix is about 80 to 20.

* * * * *